Nov. 30, 1965 U. OPRECHT 3,220,184
REGULATING DEVICE FOR GAS TURBINES
Filed Jan. 28, 1963
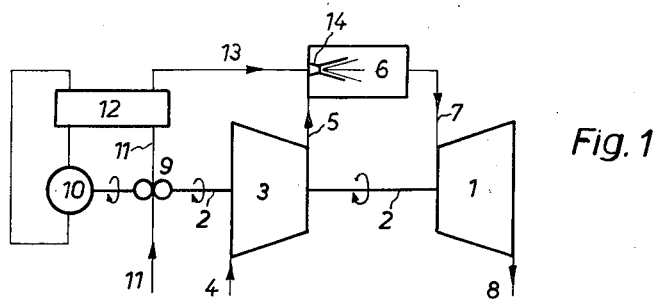
Fig. 1
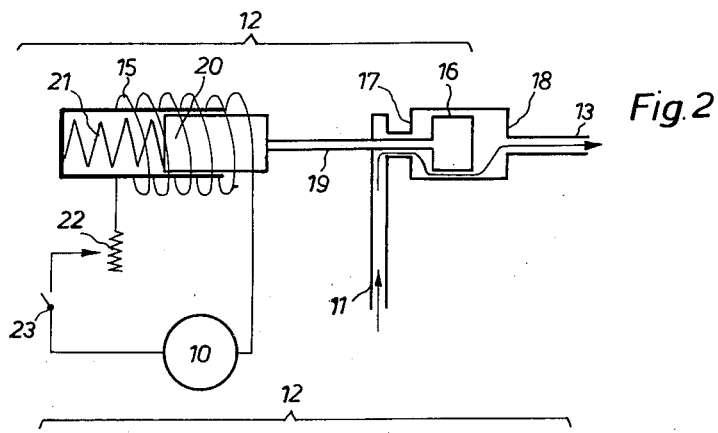
Fig. 2
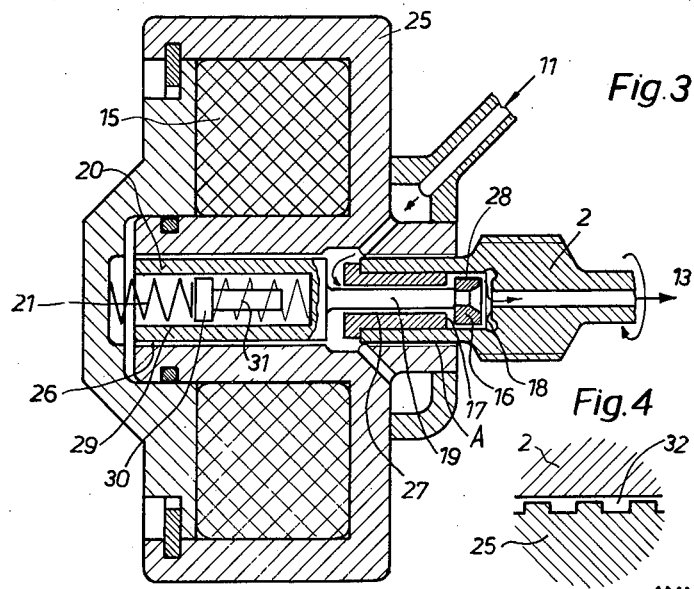
Fig. 3
Fig. 4
INVENTOR
ULRICH OPRECHT
By Thomas U Michaelis
ATT'Y

United States Patent Office 3,220,184
Patented Nov. 30, 1965

3,220,184
REGULATING DEVICE FOR GAS TURBINES
Ulrich Oprecht, Wittenbach, St. Gall, Switzerland, assignor to Adolph Saurer Ltd., Arbon, Switzerland
Filed Jan. 28, 1963, Ser. No. 254,326
Claims priority, application Switzerland, Jan. 29, 1962, 1,070/62
1 Claim. (Cl. 60—39.28)

This invention relates to power plants, and more particularly to regulating devices for gas turbines driven by means of liquid fuel.

It is an object of the invention to provide improved regulating devices operating on a combination of electromagnetic and mechanical principles, and distinguished by simplicity of construction and operation, and safety and accuracy of responsiveness to prevailing requirements.

Other objects, and the manner in which the same are attained, will become apparent as this specification proceeds.

Power plants are known which comprise a gas turbine driven by means of liquid fuel, the main shaft of the gas turbine driving a fuel pump as well as an electric generator. The fuel supply to the combustion chamber for the gas turbine, is controlled by an electromagnetic regulating valve, and the generator and the field coil of the electromagnetic regulating valve are connected to form a closed electric circuit.

The present invention contemplates to provide a power plant of the type briefly described above, with a regulating valve comprising a control member which is influenced by a spring as well as by the field coil of the electromagnetic regulating valve, and which is arranged to respond to an increase in the number of revolutions, or speed, of the turbine and an increase in the load on the spring, by a displacement throttling the supply of fuel to the combustion chamber and to respond to an interruption in the electric circuit by a displacement in the opposite direction, brought about by action of the spring, so as to interrupt entirely the supply of fuel to the combustion chamber. The regulating valve may be provided as a unit including the control member, control surfaces coordinated with the control member, and an armature surrounded by a field coil and connected with the control member. In a preferred embodiment of the invention, the armature is hollow and encloses a damping body which is influenced by a spring and arranged for longitudinal displacement, in the hollow interior of the armature. The circuit including the generator and the field coil is provided with a rheostat.

In the drawing accompanying this specification and forming part thereof, a preferred embodiment of the invention is shown diagrammatically by way of example, for purposes of illustration rather than with any limitative intent.

In the drawing,

FIG. 1 is a diagrammatic showing of a gas turbine power plant incorporating a regulating device according to the invention;

FIG. 2 shows the regulating device and associated mechanism diagrammatically illustrated in FIG. 1, in greater detail and on a larger scale;

FIG. 3 is an axial section of the regulating device shown more diagrammatically in FIGS. 1 and 2, and FIG. 4 is an axial section showing a small detail of FIG. 3 drawn to a larger scale.

Referring to the drawing, wherein like elements are denoted by identical reference numerals, and first to FIG. 1, the power plant is seen to include a turbine 1 which by means of a shaft 2, drives a compressor 3. Fresh air is sucked in by the compressor 3 through an air inlet 4, to be compressed and conveyed through a conduit 5, to a combustion chamber 6 where it is mixed with fuel injected therein. The working medium produced in the combustion chamber 6 passes through a conduit 7, into the turbine 1 from where, once it has delivered its power, it passes through the outlet 8, into the open.

Shaft 2 extends beyond compressor 3 to drive a fuel pump 9 and a generator 10, either directly as illustrated in the drawing, or else through a transmission which may be interposed between shaft 2 and the fuel pump and the generator, respectively. Fuel conveyed by fuel pump 9 through conduit 11 passes through regulating valve 12 and hence through conduit 13 to a nozzle 14 which injects the fuel into the combustion chamber 6. The working medium required for driving turbine 1 is formed in this combustion chamber.

Regulating valve 12 determines the quantity of fuel conveyed by fuel pump 9. As shown in FIG. 2, this regulating valve comprises a field coil 15 surrounding an armature 20, and a piston-like control member 16 which is arranged for cooperation with control surfaces 17 and 18, respectively. Control piston 16 is rigidly connected by means of a rod 19, with the armature 20 which is influenced by a spring 21. FIG. 2 also shows the closed electric circuit which in addition to the generator 10 and the field coil 15, includes a rheostat 22 and a switch 23.

A preferred embodiment of the regulating device diagrammatically shown in FIG. 2, is illustrated in greater detail in FIG. 3. In this embodiment shaft 2 is perforated so conduit 13 which conveys fuel to the nozzle 14 passes through the shaft. Shaft 2 terminates in thread 32 (FIG. 4) provided in the housing 25. Housing 25 and the terminal portion of shaft 2 accommodate the field coil 15, armature 20 and control piston 16, the latter being rigidly connected with armature 20 and arranged for cooperation with control faces 17 and 18 as noted above in the description of FIG. 2. Armature 20, connecting rod 19 and control piston 16 are supported for axial displacement in bores 26, 27 and 28, respectively, of varying diameters, clearances or recesses being provided to permit the fuel to pass from conduit 11 to conduit 13. Armature 20 is provided hollow and accommodates, in its interior, a damping body 30 which is exposed to the influence of two biased springs 21 and 31, respectively, the characteristics of which differ; spring 21 is so biased that while permitting the control piston 16, when coil 15 is energized, to be displaced toward or away from control face 17, it does not permit the control piston 16 to be displaced into contact with control face 17 thus closing entirely the gap serving as passage for the fuel. Spring 21 abuts at one end against the housing 25 while its other end abuts against the damping body 30; spring 31 extends in a similar manner between the damping body 30 and armature 20. Damping body 30 assures an equalized displacement of armature 20 and hence, also of control piston 16.

The voltage generated by generator 10 effects the passage of current through the field coil 15, the amperage of the current depending on the resistance of the coil. The electromagnetic force emanating from the field coil is a function of the current passing through the coil. Inasmuch as the generator 10 is directly coupled with the drive shaft 2, the voltage produced, the current passed through the field coil, and therefore, also the position of the armature 20 in relation to the field coil, all are a direct measure of the prevailing number of revolutions or speed of the turbine 1. Furthermore, since the control piston 16 is subject to precisely the same displacement as armature 20, the distances between control piston 16 and control faces 17 and 18, respectively, also depend on the number of revolutions of the turbine.

The current passing through field coil 15, can be adjusted at will by means of rheostat 22, and can be interrupted entirely by a switch 23.

The regulating device according to the invention operates as follows:

Let us assume that turbine 1 delivers the desired amount of power revolving at a speed corresponding to this power output. The quantity of fuel conveyed by fuel pump 9 and entering, through conduit 11, the housing 25, is properly adjusted for this power output by means of the regulating valve 12, and more particularly a corresponding adjustment of the position of control piston 16 in relation to control face 17. The quantity of fuel thus adjusted to prevailing requirements, leaves housing 25 through conduit 13. When, for example, the number of revolutions, or speed, of turbine 1 rises, the number of revolutions or speed of generator 10 increases correspondingly, thus increasing the current passing through field coil 15 and in consequence, also increasing the electromagnetic force exerted by the field coil. The increased force of the field coil effects a displacement of armature 20 overcoming the force of spring 21, i.e. toward the left in FIG. 3, and a corresponding displacement of control piston 16 which reduces the spacing between this piston and control face 17 thus causing a corresponding reduction in the fuel supply to conduit 13. This reduction of fuel supplied to conduit 13 and combustion chamber 6, results in a corresponding reduction in the number of revolutions, or speed, of turbine 1 which thus are restored to their desired value.

When, on the other hand, the speed of the turbine is reduced or the resistance in rheostat 22 is increased, the current passing through field coil 15 will drop. As a result of this current drop, armature 20 and control piston 16 are displaced under the influence of spring 21, to increase the spacing between control piston 16 and control face 17, i.e. toward the right in FIG. 3, thus increasing the quantity of fuel supplied through conduit 13, to the combustion chamber and accelerating the speed of the turbine until the desired value is attained.

When the circuit is interrupted by the opening of switch 23, spring 21 forces armature 20 toward the right in FIG. 3 until control piston 16 abuts against control face 18, and no fuel can pass into conduit 13. This puts an end to the combustion in chamber 6, and causes turbine 1 to come to a stop.

I wish it to be understood that I do not desire to be limited to the details of construction, design and operation shown and described as modifications within the scope of the appended claim and involving no departure from the spirit of the invention nor any sacrifice of the advantages thereof, may occur to persons skilled in the art.

I claim:

In a gas turbine plant having a combustion chamber and including a fuel pump and an electrical generator which are both driven by the main shaft of the turbine, a speed-responsive electromagnetic fuel controlling device consisting of: a fuel regulating valve having a chambered casing and fitted with a field coil which is connected with said generator in a closed circuit; said regulating valve having a movable control member with two spaced control faces operating in a chamber in said casing; said chamber having an on-off outlet orifice for fuel exiting from said valve chamber; a single metering inlet orifice in said valve chamber for delivering fuel into said valve chamber; each of said orifices being controlled by the movement of the control faces into the extreme positions; a hollow armature connected with said movable control member; a tension spring means extending into said hollow and connected at one end to said movable control member and at the other end to said casing, said outlet orifice being blocked under spring tension alone; a spring-loaded damping member which is arranged for axial displacement in the hollow of said armature; said field coil surrounding said armature so that, when energized, said control member moves in opposition to said tension spring means whereby on increase of the turbine speed said control member is displaced toward the inlet orifice to reduce the incoming fuel supply, while on interruption of the current in the field coil circuit said control member is displaced into face to face contact with the outlet orifice to completely interrupt the fuel supply to the combustion chamber.

References Cited by the Examiner

UNITED STATES PATENTS

| | | | |
|---|---|---|---|
| 1,201,128 | 10/1916 | Wirth | 251—211 X |
| 2,229,499 | 1/1941 | Fisette | 251—129 X |
| 2,760,337 | 8/1956 | Ciscel | 60—39.28 |
| 2,848,041 | 8/1958 | Hollings | 60—39.28 |
| 3,018,625 | 1/1962 | Bachle | 60—39.74 |
| 3,069,846 | 12/1962 | Buescher | 251—129 X |
| 3,121,991 | 2/1964 | Peterson | 60—39.74 |

FOREIGN PATENTS

| | | |
|---|---|---|
| 899,297 | 12/1953 | Germany. |
| 710,261 | 6/1954 | Great Britain. |

MARK NEWMAN, *Primary Examiner.*

SAMUEL LEVINE, JULIUS E. WEST, *Examiners.*